United States Patent [19]

Ploeger, Jr.

[11] Patent Number: 4,457,102
[45] Date of Patent: Jul. 3, 1984

[54] METHOD OF GROWING GRAPEVINES

[76] Inventor: Walter Ploeger, Jr., P.O. Box 869, Arden, N.C. 28704

[21] Appl. No.: 424,807

[22] Filed: Sep. 27, 1982

[51] Int. Cl.³ .............................................. A01C 1/00
[52] U.S. Cl. ........................................ 47/58; 43/108; 111/2
[58] Field of Search .................................... 47/25–28, 47/32, 58, 1, 5.5, 2, 6, 7, 48.5, DIG. 3, DIG. 10; 43/108; 111/2

[56] References Cited

U.S. PATENT DOCUMENTS

| 94,169 | 10/1869 | Jillson. | |
|---|---|---|---|
| 1,987,255 | 1/1935 | Husted | 47/26 |
| 2,192,939 | 3/1940 | Slayter et al. | 47/1 |
| 3,302,325 | 2/1967 | Ferrand | 47/74 |
| 3,828,473 | 8/1974 | Morey | 47/58 |
| 4,019,279 | 4/1977 | Moorman et al. | 47/25 |

FOREIGN PATENT DOCUMENTS

| 13335 | 9/1881 | Fed. Rep. of Germany | 43/108 |
|---|---|---|---|
| 376087 | 7/1907 | France | 43/108 |

OTHER PUBLICATIONS

Anon., "Good Earth Almanac", Natural Crafts, *Washington Post*, Jul. 22, 1973, page unknown.
Winkler, A. J. et al., "Insects that Attack Roots: Phylloxera", *General Veticulture*, University of Ca. Press, 1974, pp. 539–543.

*Primary Examiner*—James R. Feyrer
*Attorney, Agent, or Firm*—Seidel, Gonda & Goldhammer

[57] ABSTRACT

Open ended tubes which are impervious to water and having a length of at least two feet are placed in holes in the ground. The tubes are filled with a sterile growing medium. The vines are planted in said growing medium. The exposed portion of the medium is covered by a filter material porous to water but impervious to pests. The tubes force the roots to grow downwardly and then out the bottom end of the tubes and then horizontally into the native soil.

9 Claims, 2 Drawing Figures

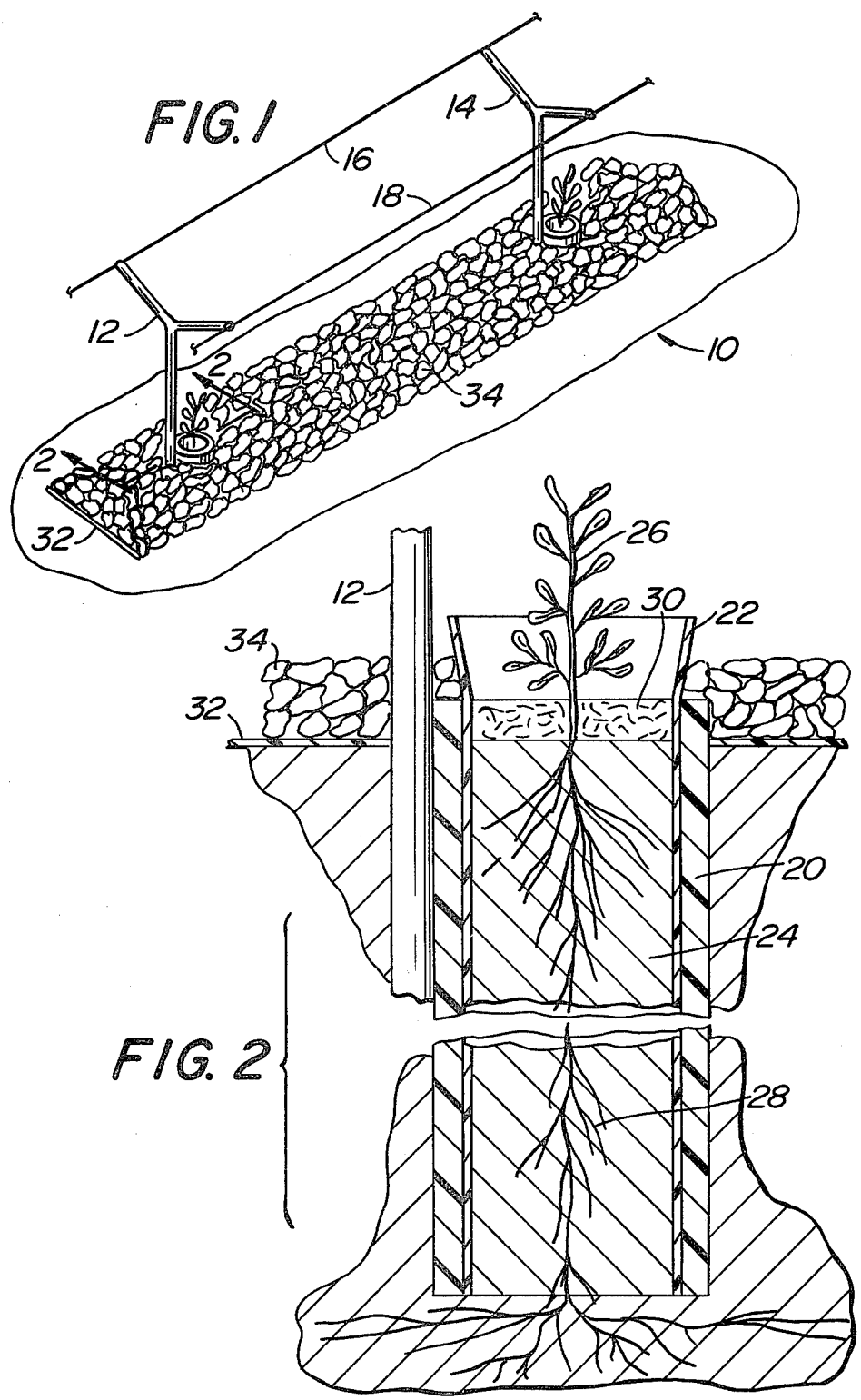

METHOD OF GROWING GRAPEVINES

BACKGROUND OF THE INVENTION

The most important genus of grapevines for making wine is the Vitis vinifera. There are a large number of problems associated with the growing of such vines. In most vinyards around the world, where climate and soil are conducive to the growth of phylloxera, the Vitis vinifera vine is grafted to native or hybrid roots. Such grafting is the remedy for the disease phylloxera which destroyed most of the vinyards in France at the end of the 19th century. The grafted joint remains a source of problems such as physical damage, vulnerability to attack by pests, etc.

Another nemesis of Vitis vinifera is the daggar nematode which is a parasitic worm and which most commonly attacks the roots of the vine. Nematodes and phylloxera are considered the two most important animal parasites.

Vitis vinifera vines require fertilization in a controlled manner at certain times of the year. One solution has been to allow weeds to grow between the vines and thereby consume nitrogen during that part of the growing cycle where the vine should not receive nitrogen. This has been a hit or miss proposition with no degree of control.

Another problem with Vitis vinifera is a fungus known as black rot. One non-chemical solution proposed heretofore is to use large fans for ventilating the fruit and leaves on the vines. That solution is costly and is not practical.

Other problems exist which are not disease related. Blooms on the vine are initiated by the temperature of the soil. Most grapevines have roots which grow horizontally close to the surface and thereby are subject to surface drought conditions. Late spring frost often kills the blooms and destroys the entire crop.

The present invention is directed to a method of growing grapevines in a manner which overcomes the above and other problems.

SUMMARY OF THE INVENTION

The present invention is directed to a method of growing grapevines which comprises the steps of digging a row of holes in the ground. Open ended tubes which are impervious to water and roots and having a length of at least two feet are provided. A tube is placed in each such hole so that the upper end of the tube is adjacent ground level. The tubes are filled with a sterile growing medium to a height whereby the exposed surface of the medium is adjacent but below the upper end of the tube. A live grapevine with roots is planted in the medium. The tube protects the grapevine roots from pests. A filter material which is porous to water but impervious to pests overlies the exposed portion of the medium. The vines are permitted to grow in a controlled manner in said medium until the roots grow downwardly through the medium to the bottom end of the tubes and then spread laterally into the native soil.

For the purpose of illustrating the invention, there is shown in the drawings a form which is presently preferred; it being understood, however, that this invention is not limited to the precise arrangements and instrumentalities shown.

FIG. 1 is a partial perspective view of a vineyard.

FIG. 2 is a sectional view taken along the line 2—2 in FIG. 1 but on an enlarged scale.

DETAILED DESCRIPTION

Referring to the drawing in detail, wherein like numerals indicate like elements, there is shown in FIG. 1 a portion of a vineyard 10. A plurality of poles 12 and 14 extend in a row and support wires 16, 18 on which the vines will grow and be supported.

A row of holes is dug in the ground with one hole adjacent each of the poles 12, 14. The holes should be at least two feet deep and may be as deep as six feet. A tube 20 is inserted in each hole in an upright manner. Tube 20 is impervious to water and roots and may be made from plastic, paper coated with plastic, metal, etc. The tube 20 is open at both ends and typically would have a diameter of about 8 to 10 inches. It is preferable to provide a liner 22 which extends above the upper end of the tube 20. Liner 22 is preferably made from a plastic material. A sterile growing medium 24, such as potting soil, is placed within the tube with an elevation slightly below the upper end of the tube. The Vitis vinifera vine 26 is planted in the medium 24. The exposed portion of the medium 24 is covered by a filter 30 which is porous to water but impervious to pests and eggs of plant pests. A wide variety of materials may be utilized as the filter. The preferred material for filter 30 is a layer of glass wool 5 to 10 cm thick.

Along the rows, the ground is covered with an impervious material such as layer 32 of a polymeric plastic material such as polyvinyl chloride. Over the layer 32, there is provided a mound of stones 34. The stones 34 are preferably granite ballast of the size and type conventionally used along railroad tracks. The stones 34 in combination with the layer 32 inhibit growth of weeds between the vines. The stones 32 act as a heat sink to provide added warmth to the fruit after sundown. In addition, the stones 34 create vertical thermals to provide ventilation to fruit and leaves for minimizing fungus disease such as black rot.

The vine 26 grows in the medium 24. The tube 20 forces the roots to grow downwardly until they have reached the bottom end of the tube 20 as illustrated in FIG. 2. Thereafter, the roots will spread out laterally as shown in FIG. 2. The tube 20 preferably has a length of at least three feet so that lateral growth of the roots will be below the frost line and sufficiently below surface level so as not to be materially affected by surface droughts. With the lateral growth of the roots at least three feet below ground level, the roots will not be influenced by the warmth of the soil at surface level during early spring and hence the blooms will not be affected by late frost in the manner existing at the present time and heretofore. At such a depth, the lateral spreading of the roots are below the known depth of penetration of the daggar nematode and phylloxera. Filter material 30 prevents pests and eggs of pests such as the grape borer from contacting the medium 24.

The use of tubes 20 enables the vines 26 to be grown under laboratory conditions. All fertilizer introduced into the sleeve 22 will be directly available to the roots without being transmitted to the surrounding soil. The filter 30 does not interfere with the application of liquid fertilizers.

As the vine 26 grows, it is pruned in a conventional manner and caused to be supported by the wires 16, 18. The stones 34 act as a heat sink after sundown for providing additional warmth to the fruit. The stones 34 also create vertical thermals to provide ventilation to the fruit and leaves thereabove. Watering of the vines is minimized and can be accomplished in a controlled manner since all water introduced into the tubes 20 will be prevented from flowing laterally into the surrounding soil. It will be noted that the solution of the present invention to the various problems encountered heretofore is accomplished in an organic manner without the need for herbicides.

The need for a graph joint between a vinifera vine and native or hybrid roots is avoided. Vinifera roots normally grow straight down and faster than native roots. The present invention eliminates the need for planting vines on the south side of a slope or the north side of a slope. The exposed portion of the liner 22 may be utilized to encase a mulch around the lower end of the vine during winter months. While the present invention eliminates the need for grafting Vitis vinifera to native or hybrid roots, the present invention provides many advantages when such vines are grafted to native or hybrid roots and can be used in connection with other grapevines which grow grapes for consumption as fruit.

The present invention may be embodied in other specific forms without departing from the spirit or essential attributes thereof and, accordingly, reference should be made to the appended claims, rather than to the foregoing specification, as indicating the scope of the invention.

I claim:

1. A method of growing grapevines comprising the steps of:
   (a) digging holes in the ground, inserting an open-ended tube which is impervious to water and roots and having a length of at least two feet in each hole so that the upper end of each tube is adjacent ground level, filling each tube with a sterile growing medium to a height whereby the exposed surface of the medium is below the upper end of each tube,
   (b) planting a live grapevine with roots in said medium, protecting the roots from pests by covering said exposed surface of the medium around said vine with a filter which is porous to liquids but impervious to the pests and eggs of pests, and
   (c) permitting the vines to grow in a controlled manner in said medium until the roots grow downwardly through said medium to the bottom end of the tubes and then spread laterally into the native soil.

2. A method in accordance with claim 1 wherein said filter is impervious to eggs of grape borer and with respect to phylloxera.

3. A method in accordance with claim 1 including using a mound of rocks between adjacent vines to perform the following functions:
   (a) inhibit growth between vines,
   (b) act as a heat sink to provide added warmth to fruit on the vine after sundown,
   (c) create vertical thermals to provide ventilation to fruit and leaves to minimize fungus disease.

4. A method in accordance with claim 3 wherein said fungus disease is black rot.

5. A method in accordance with claim 1 wherein said tubes have a length of at least three feet so that the bottom end of the tubes is below the frost line and keeps the roots which spread laterally into the native soil cooler to delay spring blossoms.

6. A method in accordance with claim 1 including adding fertilizer to the roots by introducing the fertilizer as a liquid poured through the filter into the growing medium.

7. A method in accordance with claim 1 including providing each tube with a liner, each liner having an exposed collar projected outwardly above the upper end of its associated tube so that mulch may be provided in the collar.

8. A method of growing Vitis vinifera without grafting the same to native or hybrid roots comprising the steps of:
   (a) digging a row of holes in the ground with each hole having a depth of at least three feet, inserted an open ended tube which is impervious to water and roots in each hole so that the upper end of each tube is adjacent ground level with the lower end of each tube being below the frost line, filling each tube with a sterile growing medium to a height whereby the exposed surface of the medium is adjacent but below the upper end of each tube,
   (b) planting a live Vitis vinifera vine with roots in said medium, protecting the roots from pests which attack grapevine roots by covering said exposed surface of the medium with a filter which is porous to liquids, feeding the vines in a controlled manner by introducing liquid fertilizer through said filter into said tubes, permitting the vines to grow until the roots grow downwardly through said medium to the bottom end of the tubes and then spread laterally into the native soil below the frost line.

9. A method in accordance with claim 8 including using a mound of rocks between adjacent vines to inhibit growth of weeds between vines while acting as a heat sink to provide added warmth to the fruit after sundown.

* * * * *